United States Patent [19]

Farwell

[11] 4,085,953
[45] Apr. 25, 1978

[54] DOLLY APPARATUS

[76] Inventor: Paul E. Farwell, 5503 E. Archer, Tulsa, Okla. 74115

[21] Appl. No.: 696,577

[22] Filed: Jun. 16, 1976

[51] Int. Cl.² .............................................. B66F 5/00
[52] U.S. Cl. ...................................................... 254/10 C
[58] Field of Search ................. 254/10 R, 10 B, 10 C, 254/8 R, 8 B, 8 C

[56] References Cited

U.S. PATENT DOCUMENTS

| | | | |
|---|---|---|---|
| 1,609,017 | 11/1926 | Firestone | 254/10 C |
| 1,704,777 | 3/1929 | Warshaw | 254/10 C |
| 2,756,963 | 7/1956 | Rogers | 254/10 C |

Primary Examiner—Robert C. Watson
Attorney, Agent, or Firm—Head, Johnson & Chafin

[57] ABSTRACT

A dolly apparatus for facilitating handling of heavy objects and comprising wheel mounted main support frame means and secondary frame means carried thereby, said secondary frame means being movable between a raised and a lowered position. In the lowered position of the secondary frame, the dolly apparatus may be easily rolled beneath the object to be maneuvered, whereupon the secondary frame means may be elevated for lifting the object in order to move the object simultaneously with the wheeled dolly apparatus. The main support frame structure is of a width slightly less than the inboard dimension of the support wheels, and the secondary frame means is of an overall width slightly greater than the outboard dimension of the wheels. The secondary frame is so constructed as to be lowered to a position overlaying a portion of the wheels whereby the supporting portion of the dolly apparatus is of a maximum width without unduly increasing the overall width of the entire dolly apparatus.

1 Claim, 5 Drawing Figures

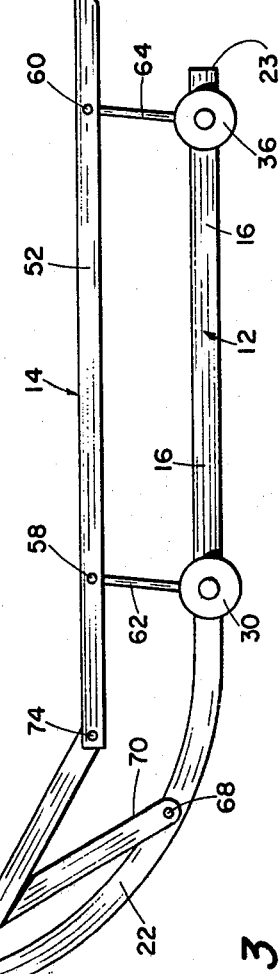
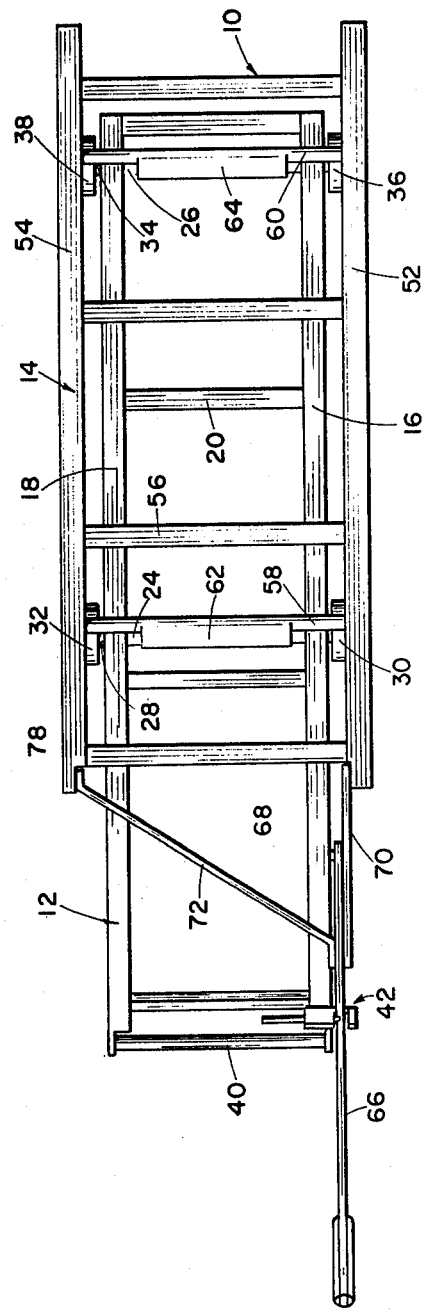
Fig. 3
Fig. 4

DOLLY APPARATUS

BACKGROUND OF THE INVENTION

1. Field of the Invention

This invention relates to improvements in dolly apparatus and more particularly, but not by way of limitation, to a dolly apparatus having a movable frame carried by a support frame wherein the movable frame is of a width for increasing the stability of the dolly in the handling of an object.

2. Description of the Prior Art

Dolly apparatus for moving objects, and particularly heavy objects, are old and well known. The usual dolly apparatus in use today normally comprises a support frame structure mounted on support wheels whereby the dolly and object carried thereby may be more easily moved from one site to another. In some instances, a secondary frame is provided for the dolly, said secondary frame being movable between a lowered position adjacent the upper surface of the support frame and a raised position spaced above the support frame. In the lowered position of the secondary frame, the dolly apparatus may be moved to a position beneath the object to be moved thereby. When the dolly has been disposed in proper position with respect to the object, the secondary frame may be elevated for lifting the object in order that the dolly may be more easily utilized for moving the object. However, these dolly devices have certain disadvantages in that the main support frame and secondary frame are both of a width slightly less than the inboard dimension of the support wheels in order that the dolly may be inserted between the support legs, or the like, of the object to be maneuvered thereby. As a result, the relatively narrow width of the secondary frame lends a certain amount of instability for the support of the object, particularly in the raised position of the secondary frame.

SUMMARY OF THE INVENTION

The present invention contemplates a novel dolly apparatus particularly designed and constructed for overcoming the foregoing disadvantages. The main support frame of the novel dolly is of an overall width slightly less than the inboard dimension between the support wheels, but the secondary frame is of an overall width very slightly greater than the outboard dimension of the wheels. However, the secondary frame is so constructed as to overlay a portion of the wheels in the lowered position thereof whereby the secondary frame may still be lowered to a position relatively clost to the surface of the ground or floor, or to a position adjacent the upper surface of the main frame yet not unduly increase the overall width of the dolly apparatus. Thus, the dolly apparatus of the present invention may be readily disposed between the support legs of the object, with the secondary frame disposed beneath the main body portion of the object, and as the secondary frame is elevated, the object or load may be handled with more stability by the dolly apparatus for facilitating handling of the object. The novel dolly apparatus is simple and efficient in operation and economical and durable in construction.

BRIEF DESCRIPTION OF THE DRAWINGS

FIG. 3 is a side elevational view of a dolly apparatus embodying the invention, with the secondary frame means thereof disposed in an elevated position.

FIG. 4 is a view taken on line 4—4 of FIG. 3.

DESCRIPTION OF THE PREFERRED EMBODIMENT

Figure 1:
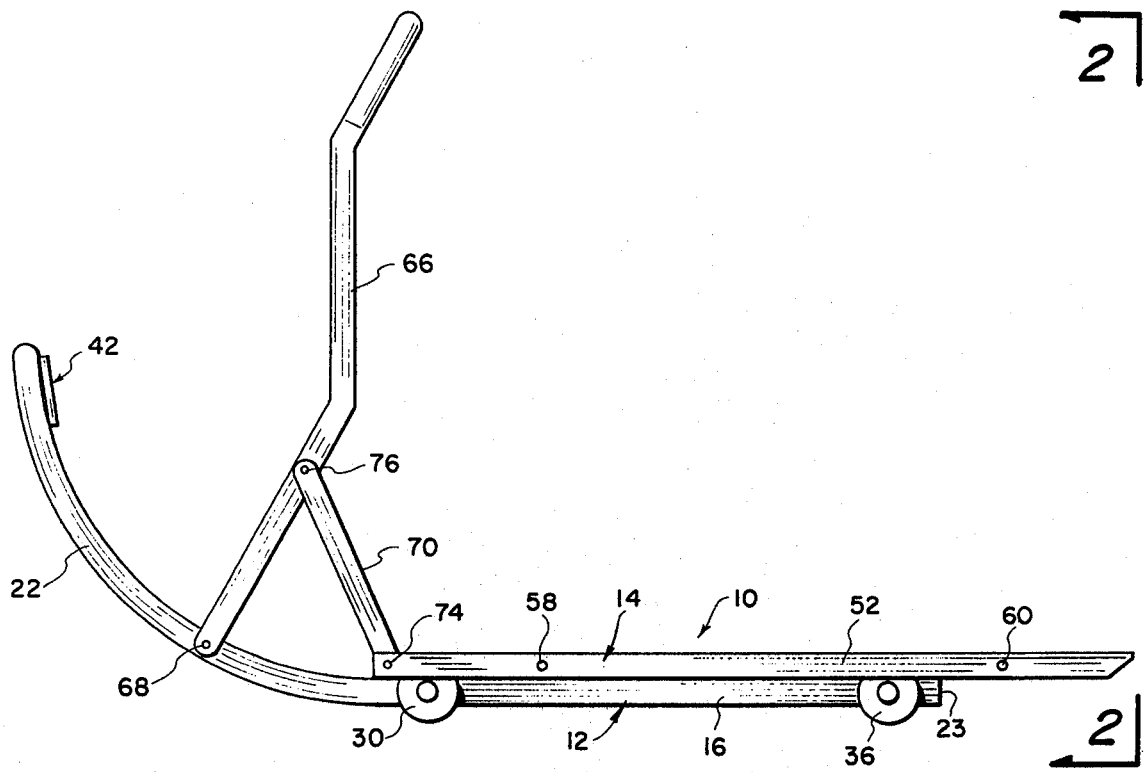
FIG. 1 is a side elevational view of a dolly apparatus embodying the invention with the secondary frame means thereof disposed in a lowered position.

Referring to the drawings in detail, reference character 10 generally indicates a dolly apparatus comprising a main support frame 12 having a secondary frame 14 movably secured thereto. Whereas the frame 12 may be of any suitable construction, as shown herein the frame 12 comprises a pair of longitudinally extending mutually parallel side braces 16 and 18 spaced apart by a plurality of spaced cross members 20 welded or otherwise secured therebetween. The side braces 16 and 18 are substantially identical, but preferably disposed in mirror image relation with respect to one another, with the following or rear ends thereof being of an upwardly extending arcuate configuration as particularly shwon at 22 in FIGS. 1 and 3. The leading or forward ends of the braces 16 and 18 preferably terminate at a point spaced slightly forwardly of the support wheels as shown at 23, and as will be hereinafter set forth. The side braces 16 and 18 are preferably constructed from angle iron, channel stock, or the like, and a pair of longitudinally spaced mutually parallel pipe members 24 and 26 are welded or otherwise rigidly secured between the side braces 16 and 18 in substantial alignment with transverse apertures (not shown) provided in the side braces 16 and 18. A first axle 28 extends through the pipe 24, and a pair of support wheels 30 and 32 are suitably journalled on the opposite ends of the axle 28 outboard of the side braces 16 and 18. A second axle 34 extends through the pipe 26 and a second pair of support wheels 26 and 28 are suitably journalled on the opposite ends of the axle 34 outboard of the side braces 16 and 18, and preferably substantially in tracking alignment with the wheels 30 and 32.

A rod member 40 is preferably secured between the outer ends of the arcuate sections 22 of the side braces 16 and 18 to provide a handle for facilitating moving of the dolly apparatus 10, as is well known. In addition, a latch mechanism 42 is secured to the inwardly directed face of one of the side braces and comprises latch housing means 44 having a pivotaly latch member 46 secured thereto for pivoting about a pivot pin 48 for alternately opening and closing access to a slot 50 provided in the housing 44, for a purpose as will be hereinafter set forth.

A secondary frame 14 comprises a pair of spaced, mutually parallel side frame members 52 and 54 preferably constructed from suitable angle iron and disposed outboard of the side braces 16 and 18, respectively. The frame members 52 and 54 are spaced apart by a plurality of longitudinally spaced cross members 56, which may be angle iron, U-channels, or the like, as desired. As particularly shown in FIG. 2, the angle iron members 52 and 54 are oppositely disposed with respect to one another, with one leg of each angle being disposed substantially vertically and outboard of the wheels 30,32 and 36,38 just sufficiently for clearing the wheels in the lowered position of the frame 14. The opposite legs of the angle members 52 and 54 are disposed in substantially horizontal alignment with each other and extend longitudinally along the upper surface of the opposite edges of the frame 14.

In addition, a pair of spaced rod members 58 and 60 are suitably journalled between the side frames 52 and 54, and are preferably disposed in substantial alignment with the axles 28 and 34 in the raised position of the frame 14, but not limited thereto. The rods 58 and 60 are connected with the pipe 24 and 26, respectively, by plate members 62 and 64 which are suitably journalled to the respective pipes for a purpose as will be hereinafter set forth. Of course, alternatively, the plates 62 and 64 may be rigidly secured to the pipes 24 and 26, and the opposite ends of the pipes may be suitably journalled to the side braces 16 and 18, if desired. In the lowered position of the frame 14 with respect to the frame 12, the outer ends of the leading ends of the frame members 52 and 54 are preferably cantilevered from or extend beyond the ends 23 of the frame members 16 and 18 for facilitating positioning of the apparatus 10 under an object (not shown) to be maneuvered thereby, as is well known.

A lifting lever 66 having one end pivotally secured to the main frame 12 by a pivot pin 68 is pivotally secured to the secondary frame 14 by means of a pair of pivotal brace arms 70 and 72. The brace arm 70 has one end pivotally secured to the side frame 52 at 74 and the opposite end pivotally secured to the lever 66 and 76. The brace arm 72 has one end pivotally secured to the side frame 54 at 78 and the opposite end thereof pivotally secured to the lever 66 at 76 oppositely disposed from the brace arm 70. Movement of the lever 66 in a counterclockwise direction about the pivot 68, as viewed in FIGS. 1 and 3 will more the lever 66 into the slot 50 of the latching mechanism 42, as particularly shown in FIGS. 3 and 4. Movement of the lever 66 in this counterclockwise direction actuates the brace arms 70 and 72 for lifting the secondary frame 14 to a position elevated with respect to the main frame 12, as particularly shown in FIGS. 3 and 5.

Figure 2:
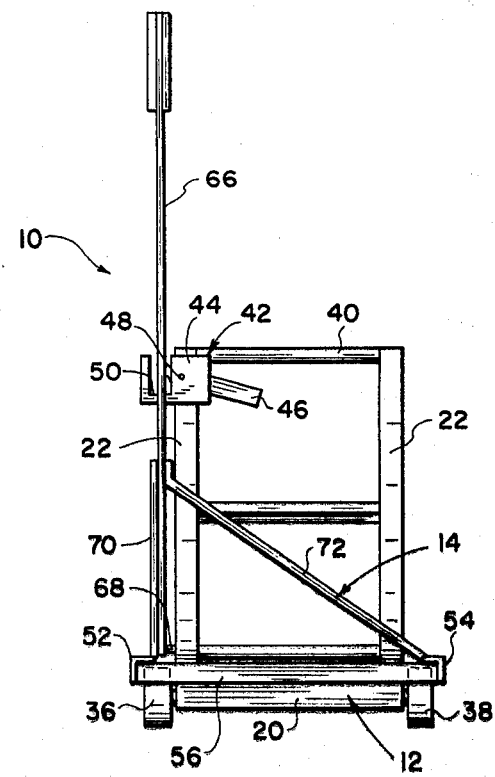
FIG. 2 is a view taken on line 2—2 of FIG. 1.

Movement of the lever arm 66 in a clockwise direction about the pivot 68 to the position shown in FIG. 1 actuates the brace arms 70 and 72 in a manner for lowering the secondary frame 14 to a position in abuttment with the main frame 12, as particularly shown in FIGS. 1 and 2. The lowered position of the frame 14 may be considered a loading position for the apparatus 10, whereas the raised or elevated position of the frame 14 may be considered as a load moving position, as will be hereinafter set forth in detail.

In the lowered or loading position of the frame 14, the angle frame members 52 and 54 overlay or encase a portion of the wheels 30, 32 and 36, 38, as particularly shown in FIG. 2. Thus, the overall width of the lifting surface of the frame 14 is relatively wide, but the overall width of the dolly apparatus 10 is very little greater than the outboard dimension of the support wheels.

Figure 5:
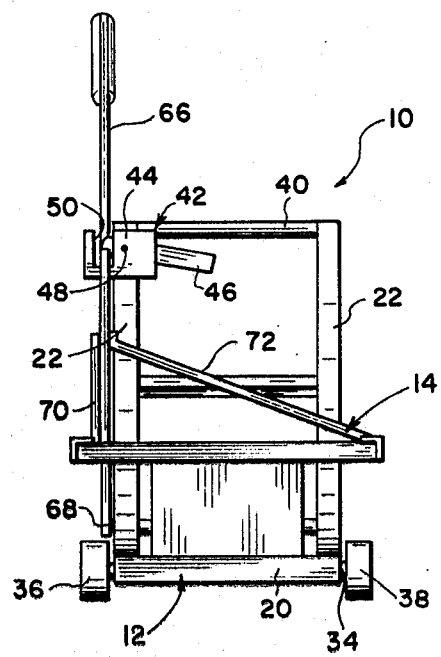
FIG. 5 is a view taken on line 5—5 of FIG. 3.

When the dolly apparatus 10 is to be utilized for lifting and moving the object (not shown), as for example a large cooling unit supported on the usual legs (not shown), the secondary frame 14 may be positioned in the loading position (FIGS. 1 and 2) whereby the dolly 10 may be manually maneuvered by use of the handle 40 in order to position the outer ends or leading ends of the frame 12 and 14 beneath the object as far as possible or practical. The lifting lever 66 may then be pivoted about the pivot pin 68 in a direction toward the latch mechanism 42 for lifting the secondary frame 14 into firm engagement with the bottom of the object. The lifting lever may then be further moved in the direction of the latching mechanism 42 for a further elevation of the secondary frame 14 in order to lift the object from the surface of the ground or floor. When the lifting lever 66 is disposed within the slot 50, as shown in FIGS. 2 and 5, the latch member 46 may be manually activated for engagement with the lever 66 in order to lock the lever in the slot, thus locking the frame 14 in the raised or elevated position thereof.

The loaded dolly apparatus 10 may then be moved about on the wheels 30, 32, 36 and 38 in the usual manner for moving the object to the desired new location or site therefor. As hereinbefore set forth, the increased width of the frame 14 greatly improves the stability in the performance of the dolly apparatus 10 during the moving of the object. When the object has been moved as desired, the latch 46 may be released from engagement with the lifting lever 66, and the lever 66 may be pivoted about the pivot pin 68 in a direction away from the latch mechanism 42 whereby the secondary frame 14 is lowered to the position against the upper surface of the main frame 12, as shown in FIGS. 1 and 2. In this position, the legs of the object being moved will be placed on the surface of the ground or floor, and the dolly apparatus 10 may be backed away from the object in the usual or well known manner.

It is an important object of this invention that the main frame 12 is disposed inboard of the wheels 30, 32 and 36, 38 and that the opposite longitudinal edges of the secondary frame 14 be slightly greater than the outboard dimension of the wheels and overlay a portion of the wheels in the lowered position of the frame 14 in order that the overall width of the frame 14 may be a maximum while maintaining the overall width of the dolly apparatus 10 at a minimum for facilitating the stability of operation of the dolly apparatus.

From the foregoing it will be apparent that the present invention provides a novel dolly apparatus having a main support frame carrying a secondary frame which is movable between a lowered loading position and a raised load moving position. The main frame is of an overall width less than the distance between the inside faces of the support wheels of the dolly, and the secondary frame is of a width slightly greater than the outboard dimension of the wheels, but overlays a portion of the wheels in the lowered position thereof for precluding any excessive overall width for the dolly, thus increasing the efficient use of the dolly apparatus.

Whereas the present invention has been described in particular relation to the drawings attached hereto, it should be understood that other and further modifications, apart from those shown or suggested herein may be made within the spirit and scope of this invention.

I claim:

1. A wheeled dolly apparatus comprising main support frame means carried by support wheel means, secondary frame means movably secured to the main support frame means and movable between raised and lowered positions with respect thereto, transversely extending rotatable plate means secured between the main support frame means and seconeary frame means for providing said raised and lowered positions for the secondary frame means, lifting lever means operably connected between the main support frame means and the secondary frame means for moving the secondary frame means between said raised and lowered positions, latch means engagable with said lifting lever means for locking the secondary frame means in said raised position, said main support frame means being of a width less than the inboard dimension of said support wheel means, and said secondary frame means being of a width greater than the outboard dimension of the support wheel means, and wherein said main support frame means comprises a pair of spaced longitudinally extending mutually parallel side brace members, a plurality of cross members secured between said side brace members, a pair of pipe members extending between said side brace members and having the opposite ends thereof open, an axle member disposed in each of said pipe members and having the opposite ends thereof extending longitudinally beyond the respective pipe members, wheel members journalled at the opposite ends of each of said axle members and disposed outboard of the said side brace members to provide said support wheel means for the dolly apparatus, and wherein said rotatable plate means comprises transversely extending pipe members provided on the secondary frame means in the proximity of each of the first mentioned pipe members, and transversely extending plate means secured between the complementary positioned pipe members of the main frame means and secondary frame means, and wherein the secondary frame means includes a pair of transversely spaced mutually parallel longitudinally extending side frame members terminating along the side edges thereof slightly outboard of the support wheels and overlaying a portion of the support wheels in the lowered position of the secondary frame means.

* * * * *